United States Patent
Jeong et al.

(10) Patent No.: US 8,330,788 B2
(45) Date of Patent: Dec. 11, 2012

(54) METHOD AND APPARATUS FOR VIDEO TELEPHONY IN PORTABLE TERMINAL

(75) Inventors: Wook-Hyun Jeong, Suwon-si (KR); Jong-Cheul Park, Jeonranam-do (KR); Jin-Woo Jung, Suwon-si (KR); Hee-Young Lee, Yongin-si (KR)

(73) Assignee: Samsung Electronics Co., LTD (KR)

( * ) Notice: Subject to any disclaimer, the term of this patent is extended or adjusted under 35 U.S.C. 154(b) by 1536 days.

(21) Appl. No.: 11/829,612

(22) Filed: Jul. 27, 2007

(65) Prior Publication Data
US 2008/0028428 A1 Jan. 31, 2008

(30) Foreign Application Priority Data
Jul. 31, 2006 (KR) ........................ 10-2006-0071943

(51) Int. Cl.
*H04N 7/14* (2006.01)
(52) U.S. Cl. ................ 348/14.01; 348/14.02; 348/14.12
(58) Field of Classification Search .... 348/14.01–14.16; 386/241
See application file for complete search history.

(56) References Cited

U.S. PATENT DOCUMENTS

| | | | | |
|---|---|---|---|---|
| 6,741,272 | B1* | 5/2004 | Kato | 348/14.01 |
| 6,751,404 | B1* | 6/2004 | Whitford et al. | 386/241 |
| 7,062,250 | B1* | 6/2006 | Kosaka | 455/343.5 |
| 2002/0004840 | A1 | 1/2002 | Harumoto et al. | |
| 2003/0222973 | A1* | 12/2003 | Hiroi et al. | 348/14.01 |
| 2004/0085304 | A1 | 5/2004 | Hsieh | |
| 2004/0264577 | A1 | 12/2004 | Jung | |
| 2006/0002373 | A1* | 1/2006 | Denny | 370/352 |

FOREIGN PATENT DOCUMENTS

| | | |
|---|---|---|
| EP | 0 562 221 | 9/1993 |
| JP | 10191348 | 7/1998 |
| KR | 1020010073665 | 8/2001 |
| KR | 1020040036358 | 4/2004 |
| KR | 1020050015790 | 2/2005 |

* cited by examiner

*Primary Examiner* — Melur Ramakrishnaiah
(74) *Attorney, Agent, or Firm* — The Farrell Law Firm, P.C.

(57) ABSTRACT

Provided is a method and apparatus for video telephony in a portable terminal. In the method, all image frames received from a video telephony counterpart terminal are decoded when a video telephony event is detected. Thereafter, it is determined if the received image frames are accumulated in a buffer of the portable terminal. Thereafter, only a portion of the decoded image frames are selected and displayed when the received image frames are accumulated in the buffer.

16 Claims, 4 Drawing Sheets

METHOD AND APPARATUS FOR VIDEO TELEPHONY IN PORTABLE TERMINAL

PRIORITY

This application claims priority under 35 U.S.C. §119 to an application filed in the Korean Intellectual Property Office on Jul. 31, 2006 and assigned Serial No. 2006-71943, the contents of which are incorporated herein by reference.

BACKGROUND OF THE INVENTION

1. Field of the Invention

The present invention relates generally to a method and apparatus for video telephony in a portable terminal, and more particularly, to a method and apparatus for, when image frames are cumulatively stored during a video telephony operation of a portable terminal, selectively displaying the cumulatively-stored image frames to prevent a processing delay of the image frame.

2. Description of the Related Art

The International Mobile Telecommunications (IMT)-2000 system, used as the third-generation (3G) mobile communication system, provides a world-wide wireless telephony network and thus enables many users to perform worldwide wireless telephony via portable telephones. Wideband Code Division Multiple Access (CDMA) (WCDMA) mobile communication systems such as the IMT-2000 system and the Universal Mobile Telecommunications System (UMTS), are suitable for high-rate data transmission and thus provide not only a voice telephony service but also image services such as an Internet service and a video telephony service.

FIG. 1A illustrates an apparatus for processing image frames received in a conventional portable terminal and FIG. 1B illustrates a graph showing the time-dependent number of the received frames. FIG. 2A illustrates an apparatus for processing image frames cumulatively received in a conventional portable terminal and FIG. 2B illustrates a graph showing the time-dependent number of the cumulatively-received frames.

In general, as illustrated in FIG. 1A, after one image frame 107 is received in an RX frame buffer 101, a portable terminal decodes the received image frame 107 by a decoder 103 and displays the resulting image on a display unit 105 prior to receiving the next image frame. By doing so, as illustrated in FIG. 1B, the portable terminal processes the received image frame within the maximum frame decoding/displaying time on a one-by-one basis, thereby providing a real-time video telephony service.

However, received image data may be discarded due to a CRC(Cyclic Redundancy check) error and an RX data rate of a modem in the portable terminal, and received image frames may fail to be stored and processed in the portable terminal at the same frame rate as that of a counterpart terminal due to the real-time uplink/downlink operations of a Dual-Port RAM (DPRAM). Therefore, as illustrated in FIG. 2A, the received image frames may be cumulatively stored in an RX frame buffer 201.

In addition, although a high-speed processor must be used to process the received image data in real time most conventional portable terminals do not use the high-speed processor in order to reduce costs. Thus, the conventional portable terminal fails to properly decode and display the received image frame, causing problems such as frame process delay and cumulative delay. For example, when two or more received image frames 207 accumulate in the RX frame buffer 201 as illustrated in FIG. 2B, the decoder 203 and the display unit 205 must decode and display the two or more accumulated image frames 207 within the time for decoding/displaying one image frame, which causes a display time for each image frame to be too short. Moreover, the decoder 203 may fail to process even one image frame within the time for decoding/displaying one image frame and thus the received image frames may continue to accumulate in the RX frame buffer 201, causing a continuous frame processing delay.

As described above, the number of the received image frames varies according to circumstances and also the frame processing time in the decoder and the display unit varies according to CPU occupation circumstances. Consequently, a display delay occurs due to a continuous frame processing delay. In addition, the processing delay causes incorrect synchronization between voice data and image data.

SUMMARY OF THE INVENTION

An object of the present invention is to substantially solve at least the above problems and/or disadvantages and to provide at least the advantages below. Accordingly, an object of the present invention is to provide a method and apparatus for video telephony in a portable terminal.

Another object of the present invention is to provide a method and apparatus for selectively displaying image frames received during a video telephony operation of a portable terminal, thereby reducing a frame processing time.

Still another object of the present invention is to provide a method and apparatus for selectively displaying image frames received during a video telephony operation of a portable terminal, thereby stabilizing an image decoder and a display unit of the portable terminal.

According to one aspect of the present invention, a method for video telephony in a portable terminal includes when a video telephony event is detected, decoding all image frames received from a video telephony counterpart terminal; determining if the received image frames accumulate in a buffer of the portable terminal, and when the received image frames accumulate in the buffer, selecting and displaying only a portion of the decoded image frames.

According to another aspect of the present invention, an apparatus for video telephony in a portable terminal includes an image processor for, when a video telephony event is detected, determining if image frames received from a counterpart terminal accumulate in a buffer of the portable terminal, decoding the accumulated image frames and outputting the decoded image frames selectively according to a number determined by a frame processor; the frame processor for, when the video telephony event is detected, measuring video telephony system resources to determine a number of image frames not to be displayed; and a display unit for displaying the image frames received from the image processor.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method and apparatus for, when image frames are cumulatively stored during a video telephony operation of a portable terminal selectively displaying the cumulatively-stored image frames to prevent a processing delay of the image frame.

Figure 1A:
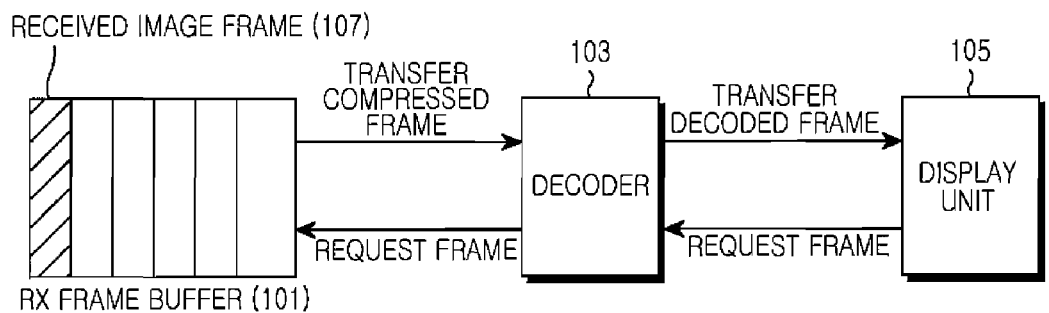
FIG. 1A illustrates an apparatus for processing image frames received in a conventional portable terminal.
Figure 1B:
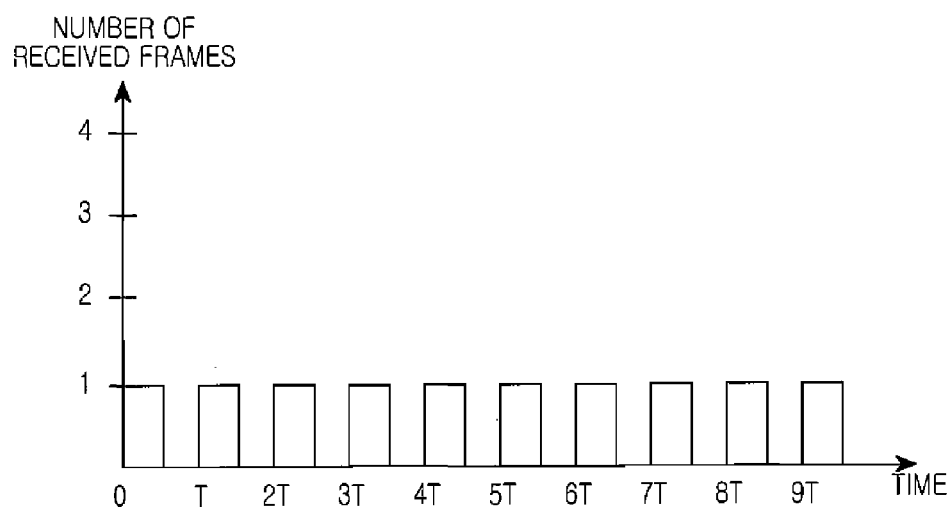
FIG. 1B illustrates a graph showing the time-dependent number of the received frames in a conventional portable terminal.
Figure 2A:
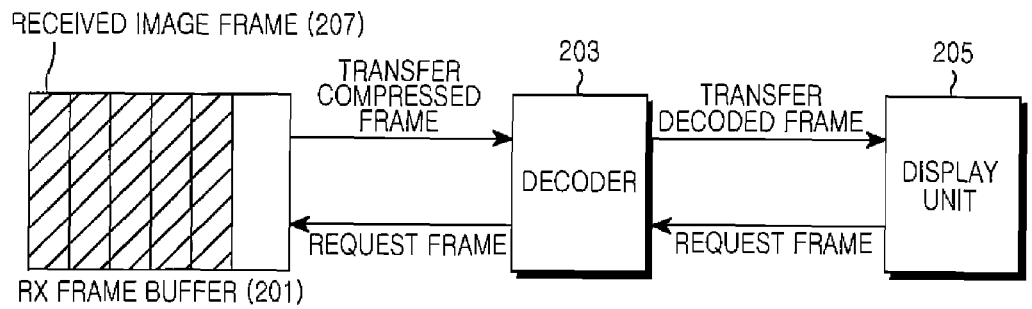
FIG. 2A illustrates an apparatus for processing image frames cumulatively received in a conventional portable terminal.
Figure 2B:
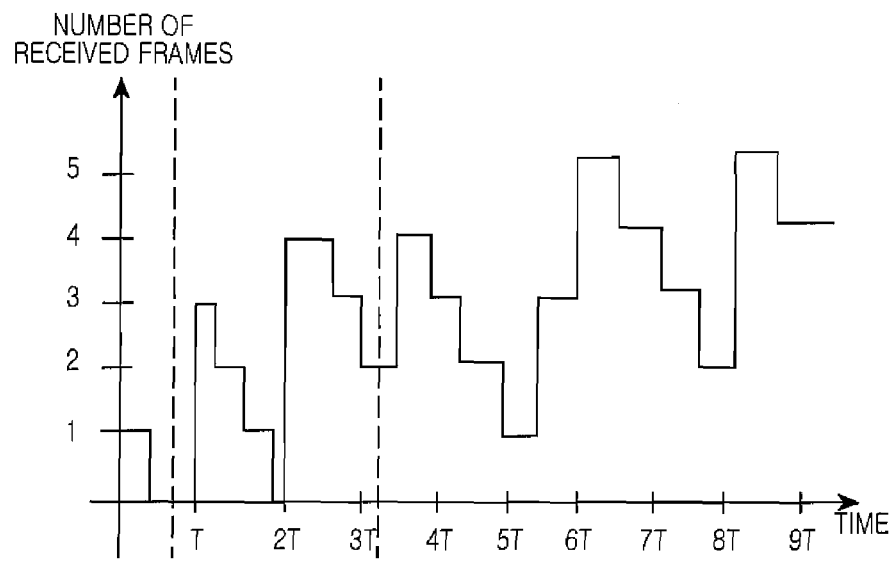
FIG. 2B illustrates a graph showing the time-dependent number of the cumulatively-received frames in a conventional portable terminal.
Figure 3:
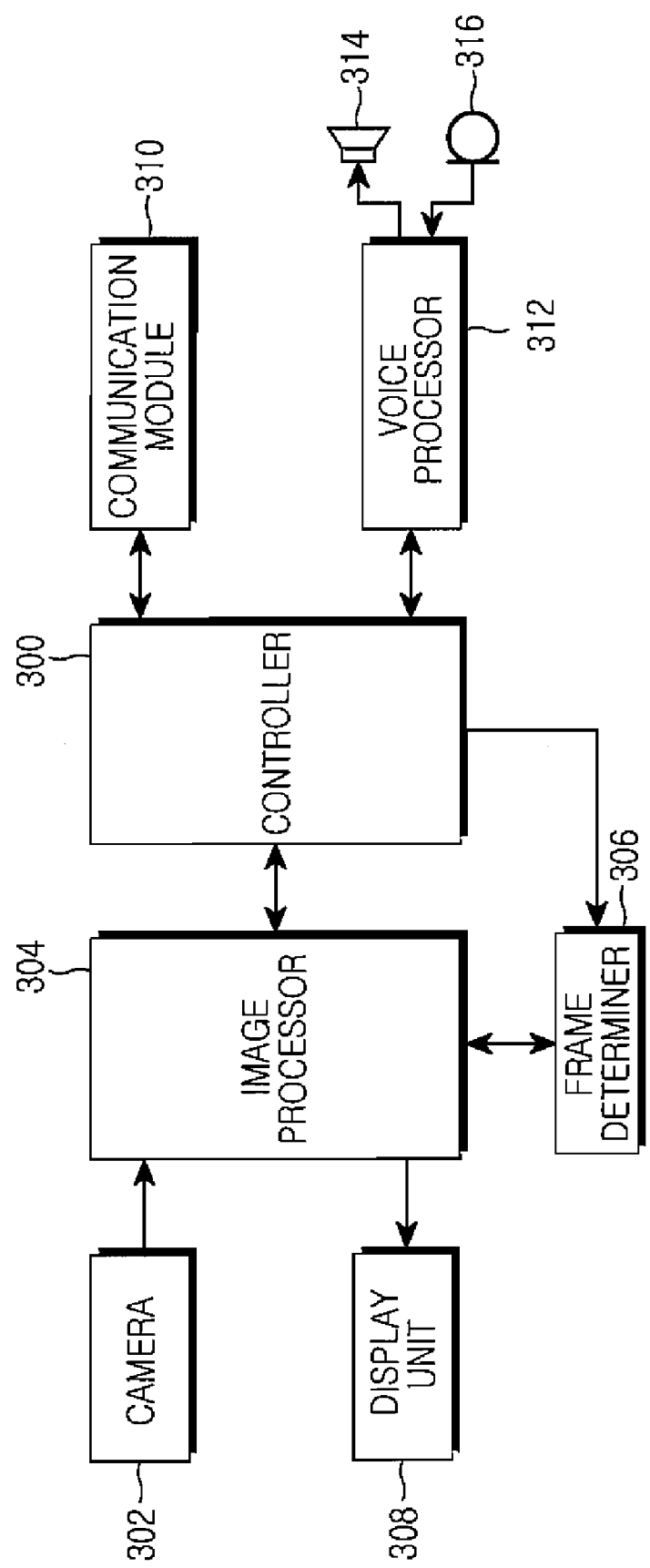
FIG. 3 is a block diagram of a portable terminal according to the present invention.

Referring to FIG. 3, the portable terminal includes a controller 300, a camera 302, an image processor 304, a frame determiner 306, a display unit 308, a communication module 310 a voice processor 312, a speaker 314 and a microphone 316.

The controller 300 processes and controls voice communication and data communication. According to the present invention when a video telephony event occurs the controller 300 receives an image signal and a per-second frame rate $FR_{remote}$ from the communication module 310 and outputs the received image signal and the received frame rate $FR_{remote}$ respectively to image processor 304 and the frame determiner 306.

The camera 302 includes a camera sensor for converting an optical signal sensed during image photographing into an electrical signal and a signal processor for converting an analog image signal sensed by the camera sensor into digital data. The camera 302 outputs the digital image signal to the image processor 304.

The image processor 304 is also called an image CODEC (coder-decoder). The image processor 304 encodes an image signal received from the camera 302 in a predetermined scheme, and decodes encoded frame image data into original frame image data. In addition the image processor 304 processes an output image signal of the camera 302 on a frame by frame basis to output the resulting signal in accordance with the feature and size of the display unit 308, and decodes an image signal received from the controller 300 into an original image frame to output the original image frame to the display unit 308 during the video telephony operation. In particular the image processor 304 includes a buffer for temporarily storing an image frame. The image processor 304 determines whether the image signals received from the controller 300 (i.e., image frames received from a video telephony counterpart terminal) accumulate in the buffer. When the image frames accumulate in the buffer, the image processor 304 outputs a signal indicating the accumulation of the image frames (hereinafter a frame accumulation indicating signal) to the frame determiner 306. Thereafter, the image processor 304 receives image frames to be skipped, i.e., the number $NF_{skip}$ of image frames to be not displayed (hereinafter the frame skip number $NF_{skip}$) from the frame determiner 306 to select $NF_{skip}$ image frames among the decoded original image frames, and outputs only the remaining image frames other than the selected image frames to the display unit 308.

Every time when receiving the per-second frame rate $FR_{remote}$ of the counterpart terminal from the controller 300 the frame determiner 306 divides 1 second by the frame rate $FR_{remote}$ (1 sec/$FR_{remote}$) to calculate the maximum processing time $T_{process\_max}$ within which one image frame must be processed. In addition, when a video telephony event occurs, the frame determiner 306 measures the average decoding time $T_{dec}$ taken to decode one image frame and the average display time $T_{disp}$ taken to display the decoded image frame. Thereafter when receiving a frame accumulation indicating signal from the image processor 304, the frame determiner 306 measures the number $NF_{dec}$ of image frames cumulatively stored in the buffer of the image processor 304, calculates the total process time ($NF_{dec} \times (T_{dec}+T_{disp})$) taken to process all the cumulatively-stored image frames, and calculates the over processing time ($T_{over}=NF_{dec} \times (T_{dec}+T_{disp})-T_{process\_max}$) that is additionally taken over the maximum processing time $T_{process\_max}$ Thereafter the frame determiner 306 divides the over processing time by the average display time ($T_{over}/T_{disp}$) to calculate the frame skip number $NF_{skip}$ and the calculated image skip number to the image processor 304. Alternatively, the over processing time $T_{over}$ may be determined to be the total process time ($NF_{dec} \times (T_{dec}+T_{disp})$) minus the maximum total processing time ($NF_{dec} \times T_{process\_max}$) within which the cumulatively-stored image frames must be processed.

The display unit 308 displays a predetermined number of characters and status information generated during an operation of the portable terminal. In particular, the display unit 308 displays the image frames received from the image processor 304 according to the present invention.

The communication module 310 TX/RX-processes radio-frequency (RF) signals transmitted/received through an antenna (not shown). For example, the communication module 310 converts a baseband signal, which is obtained by performing channel coding and spreading on data to be transmitted into an RF signal and transmits the RF signal through the antenna. In addition, the communication module 310 converts a received RF signal into a baseband signal and performs despreading and channel decoding on the received data to recover original data. In particular according to the present invention, the communication module 310 receives an image signal and a per-second frame rate $FR_{remote}$ from a video telephony counterpart terminal and provides the same to the controller 300. The per-second frame rate $FR_{remote}$ changes during the video telephony operation. Therefore, every time when the per-second frame rate $FR_{remote}$ changes, the communication module 310 receives the per-second frame rate $FR_{remote}$ and provides the same to the controller 300.

The voice processor 312 is also called a voice CODEC. The voice processor 312 I/O-processes voice signals through the speaker 314 and the microphone 316. For example, the voice processor 312 converts Pulse Code Modulation (PCM) data received from the controller 300 into analog audio signals and outputs the analog audio signals to the speaker 314. In addition, the voice processor 312 converts audio signals received from the microphone 316 into PCM data and provides the PCM data to the controller 300.

Figure 4:
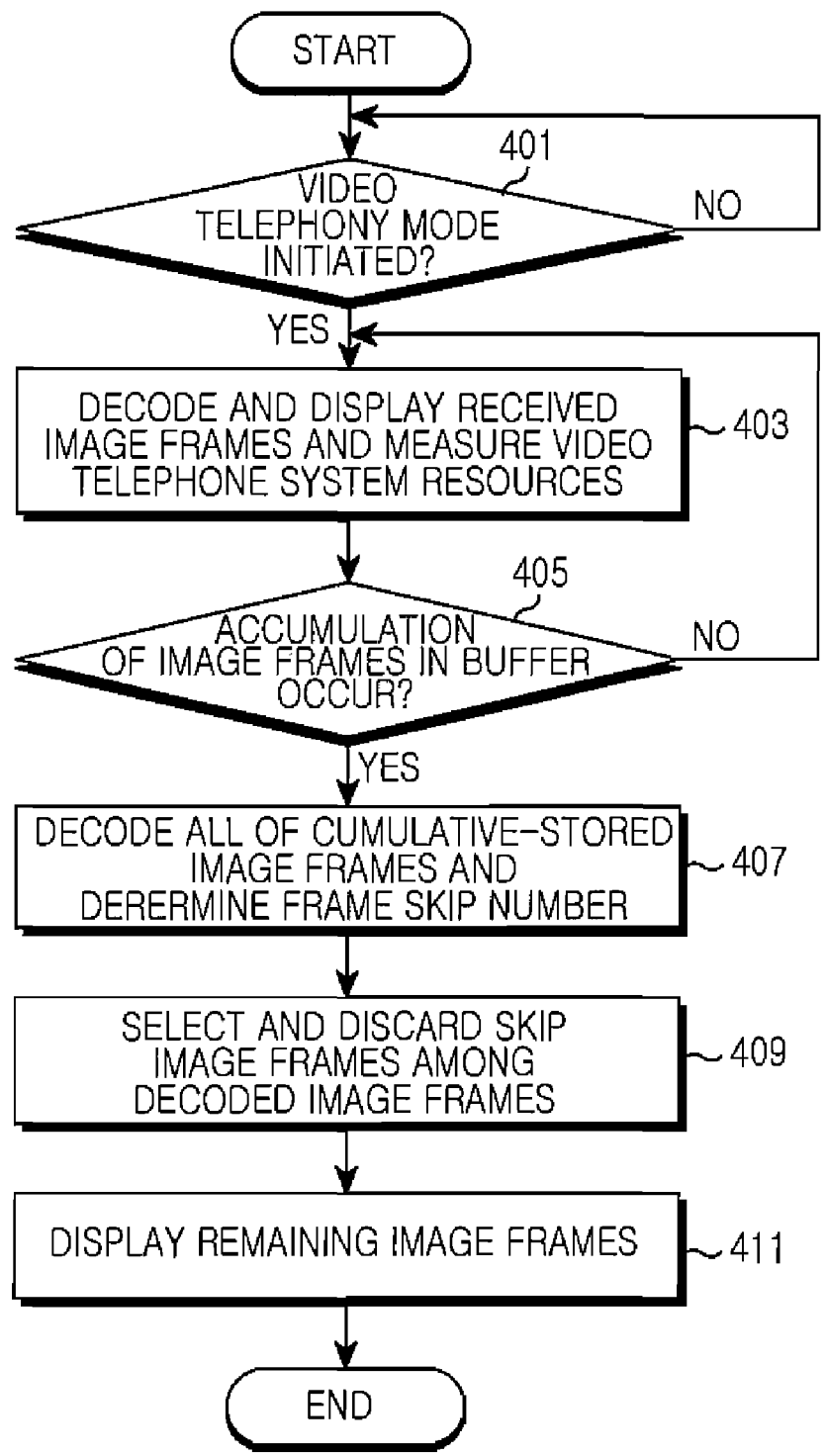
FIG. 4 is a flowchart illustrating a procedure for processing image frames accumulated during a video telephony operation of a portable terminal according to the present invention.

FIG. 4 is a flowchart illustrating a procedure for processing image frames cumulated during a video telephony operation of the portable terminal according to the present invention.

Referring to FIG. 4, the portable terminal determines in step 401 whether a video telephony mode is initiated. When the video telephony mode is initiated, the portable terminal decodes and displays a received image frame and measures the resources of a video telephony system in step 403. The resources of the video telephony system are the per-second frame rate $FR_{remote}$ of a counterpart terminal, the maximum processing time $T_{process\_max}$ within which one image frame must be processed, the average decoding time $T_{dec}$ taken to decode one image frame, and the average display time $T_{disp}$ taken to display one image frame. The maximum processing time $T_{process\_max}$ may be obtained by dividing 1 second by the per-second frame rate $FR_{remote}$.

In step 405, the portable terminal determines if image frames received from the counterpart terminal are cumulatively stored in the buffer. If not, the procedure returns to step 403: and if so, the procedure proceeds to step 407.

In step 407, the portable terminal decodes all the cumulatively-stored image frames, measures the number of cumulatively-stored image frames, and determines the frame skip number $NF_{skip}$ using the measured video telephony system resources. The frame skip number $NF_{skip}$ may be obtained by calculating the over processing time $(T_{over}=NF_{dec}\times(T_{dec}+T_{disp})-T_{process\_max})$ that is additionally taken over the maximum processing time $T_{process\_max}$ and dividing the over processing time $T_{over}$ by the average display time $T_{disp}$ ($T_{over}/T_{disp}$). In addition, because each of the image frames is closely correlated with the previous image frame and the next image frame, the previous image frame is needed in order to accurately decode the image frame. Therefore it is necessary to decode all of the received image frames.

In step 409, the portable terminal selects $NF_{skip}$ image frames among the decoded image frames. In step 411, the portable terminal displays the remaining image frames other than the selected image frames on the display unit 308. Thereafter, the procedure is ended.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

As described above when the image frames received from the counterpart terminal are cumulatively stored during the video telephony operation of the portable terminal the present invention selectively displays the cumulatively-stored image frames to prevent a processing delay of the image frame. Accordingly, it is possible to stabilize the CPU occupation rate of an image decoder of the portable terminal.

While the invention has been shown and described with reference to certain preferred embodiments thereof it will be understood by those skilled in the art that various changes in form and details may be made therein without departing from the spirit and scope of the invention as defined by the appended claims.

What is claimed is:

1. A method for video telephony in a portable terminal, comprising the steps of:
    decoding all image frames received from a video telephony counterpart terminal;
    determining if a received image frames are accumulated in a buffer of the portable terminal; and
    when the received image frames are accumulated in the buffer, selecting and displaying only a portion of the decoded image frames,
    wherein selecting and displaying only a portion of the decoded image frames comprises:
    determining the number of image frames not to be displayed;
    selecting a said determined number of image frames among the decoded image frames; and
    displaying the remaining image frames other than the selected image frames among the decoded image frames.

2. The method of claim 1, further comprising measuring video telephony system resources to select the portion of the decoded image frames when the video telephony event is detected.

3. The method of claim 2, wherein the video telephony system resources include at least one of a per-second frame rate of the counterpart terminal, the maximum processing time within which one image frame must be processed, the average decoding time taken to decode one image frame, and the average display time taken to display one image frame.

4. The method of claim 1, wherein determining the number of image frames not to be displayed comprises:
    calculating a total processing time taken to process all the image frames accumulated in the buffer;
    calculating an over processing time by subtracting the maximum processing time, within which one image frame must be processed, from the calculated total processing time; and
    dividing the calculated over processing time by the average display time taken to display one image frame, to determine the number of image frames not to be displayed.

5. The method of claim 4, wherein the total processing time taken to process all the image frames accumulated in the buffer is calculated by multiplying the sum of the average decoding time taken to decode one image frame and the average processing time taken to display one image frame by the number of the accumulated image frames.

6. The method of claim 1, wherein determining the number of image frames not to be displayed comprises:
    calculating the total processing time taken to process all the image frames accumulated in the buffer;
    calculating an over processing time by subtracting the maximum total processing time, within which the accumulated image frames must be processed, from the calculated total processing time; and
    dividing the calculated over processing time by the average display time taken to display one image frame, to determine the number of image frames not to be displayed.

7. The method of claim 6, wherein the total processing time taken to process all the image frames accumulated in the buffer is calculated by multiplying the sum of the average decoding time taken to decode one image frame and the average processing time taken to display one image frame by the number of the accumulated image frames.

8. The apparatus of claim 7, wherein, for the selective outputting of the decoded image frames, the image processor selects a predetermined number of image frames among the decoded image frames and outputs the remaining image frames other than the selected image frames among the decoded image frames.

9. The apparatus of claim 7, wherein the video telephony system resources include at least one of a per-second frame rate of the counterpart terminal, the maximum processing time within which one image frame must be processed, the average decoding time taken to decode one image frame, and the average display time taken to display one image frame.

10. An apparatus for video telephony in a portable terminal, comprising:
   an image processor for, determining if image frames received from a counterpart terminal are accumulated in a buffer of the portable terminal, decoding the accumulated image frames, and outputting the decoded image frames selectively according to a number determined by a frame determiner;
   the frame determiner for, when the image frames are accumulated in the buffer, measuring video telephony system resources to determine a number of image frames not to be displayed; and
   a display unit for displaying the image frames received from the image processor.

11. A portable terminal for video telephony, comprising:
   an image processor for determining if the received image frames are accumulated in a buffer of the portable terminal and for decoding the accumulated image frames; and
   a frame determiner for determining a number of image frames not to be outputted among the decoded image frames.

12. The portable terminal of claim 11, wherein the frame determiner measures video telephony system resources to determine the image frames not to be outputted among the decoded image frames.

13. The portable terminal of claim 11, wherein the video telephony system resources include at least one of a per-second frame rate of the counterpart terminal, the maximum processing time within which one image frame must be processed, the average decoding time taken to decode one image frame, and the average display time taken to display one image frame.

14. A method for video telephony in a portable terminal, comprising the steps of:
   determining if the received image frames are accumulated in a buffer of the portable terminal;
   decoding the accumulated image frames; and
   determining a number of image frames not to be outputted among the decoded image frames.

15. A portable terminal for video telephony, comprising:
   means for determining if the received image frames are accumulated in a buffer of the portable terminal;
   means for decoding the accumulated image frames; and
   means for determining a number of image frames not to be outputted among the decoded image frames.

16. A non-transitory computer-readable recording medium having recorded thereon a program for video telephony in a portable terminal, comprising:
   a first code segment, for determining if the received image frames are accumulated in a buffer of the portable terminal;
   a second code segment, for decoding the accumulated image frames; and
   a third code segment, determining a number of image frames not to be outputted among the decoded image frames.

* * * * *